(12) United States Patent
Koskovich et al.

(10) Patent No.: US 6,702,096 B2
(45) Date of Patent: Mar. 9, 2004

(54) INTELLIGENT DECK APPARATUS AND METHOD FOR POSITIONING WORKPIECES IN PREPARATION FOR PROCESSING

(75) Inventors: Jerome E. Koskovich, Byron, MN (US); James E. McKeon, Mazeppa, MN (US); Danny R. Nelson, Utica, MN (US); Trevor S. Scrabeck, Stewartville, MN (US)

(73) Assignee: The Koskovich Company, Rochester, MN (US)

( * ) Notice: Subject to any disclaimer, the term of this patent is extended or adjusted under 35 U.S.C. 154(b) by 148 days.

(21) Appl. No.: 10/057,744

(22) Filed: Jan. 23, 2002

(65) Prior Publication Data

US 2002/0156544 A1 Oct. 24, 2002

Related U.S. Application Data

(60) Provisional application No. 60/263,373, filed on Jan. 23, 2001.

(51) Int. Cl.$^7$ ............................................... B65G 47/26
(52) U.S. Cl. ........................... 198/459.5; 198/457.01; 198/460.3; 144/356; 144/414
(58) Field of Search .................. 198/345.1, 341.01, 198/457.01, 459.5, 459.6, 460.1, 460.3, 463.5, 464.1; 144/356, 357, 414, 416

(56) References Cited

U.S. PATENT DOCUMENTS

| | | | |
|---|---|---|---|
| 3,079,963 A | 3/1963 | Jensen | |
| 3,491,809 A | 1/1970 | Schneider | |
| 3,608,695 A | * 9/1971 | Hellstrom | 198/459.5 |
| 3,621,975 A | * 11/1971 | Vilen | 198/460.1 |
| 3,866,740 A | * 2/1975 | Greathead | 198/459.5 |
| 3,970,128 A | 7/1976 | Kohlberg | 144/245 |
| 4,136,608 A | 1/1979 | Gladd et al. | |
| 4,305,538 A | 12/1981 | Schultz et al. | 227/2 |
| 4,558,424 A | 12/1985 | Oguchi et al. | |
| 4,606,387 A | 8/1986 | Weislogel et al. | 144/356 |
| 4,869,360 A | * 9/1989 | Brown et al. | 198/460.1 |
| 4,879,752 A | 11/1989 | Aune et al. | 382/1 |
| 5,208,962 A | 5/1993 | Walker, Jr. | 29/432 |
| 5,518,106 A | * 5/1996 | Allard | 198/459.5 |
| 5,521,830 A | 5/1996 | Saito | |
| 5,605,216 A | 2/1997 | Raybon et al. | 198/395 |
| 5,662,203 A | * 9/1997 | St-Pierre et al. | 198/463.5 |
| 5,685,410 A | 11/1997 | Ritola et al. | 198/457 |
| 5,992,484 A | 11/1999 | Jackson | 144/245.1 |
| 6,409,451 B1 | 6/2002 | Fallin et al. | |
| 2001/0054535 A1 | 12/2001 | Faitel | |

OTHER PUBLICATIONS

Product brochure for Virtek Lacer Mc Company of Ontario, Canada.

Giussani L.C., *Stimulation Studies in a Hot Mill Facility*, Proceedings of the 23$^{rd}$ Conference on Winter Simulation, 1991, pp. 474–481.

Causey et al., *Design of a Flexible Parts Feeding System*, Proceedings of the 1997 IEEE International Conference on Robotics and Automation, Apr. 1997, vol. 2, pp. 1235–1240.

Okada et al., *Automatic Identification of Conveyer–Transferred Parts Through Image Data Processing*, 20$^{th}$ International Conference on Industrial Electronics, Control and Instrumentation, Sep. 1994, vol. 2, pp. 719–722.

International Search Report.

* cited by examiner

*Primary Examiner*—Khoi H. Tran
(74) *Attorney, Agent, or Firm*—Patterson, Thuente, Skaar & Christensen, P.A.

(57) ABSTRACT

An intelligent deck apparatus and method for serially moving workpieces moving side-by-side on a conveyor system to a processing system. The intelligent deck is comprised of an edge detector system having at least one sensor, a shift mechanism, and a lift arm system having at least one lift arm. The intelligent deck apparatus also has a computer system operatively connected to the working parts of the intelligent deck and the processing system. The intelligent deck distinguishes between workpieces by shifting the leading workpiece to distinguish it from subsequent workpieces.

17 Claims, 4 Drawing Sheets

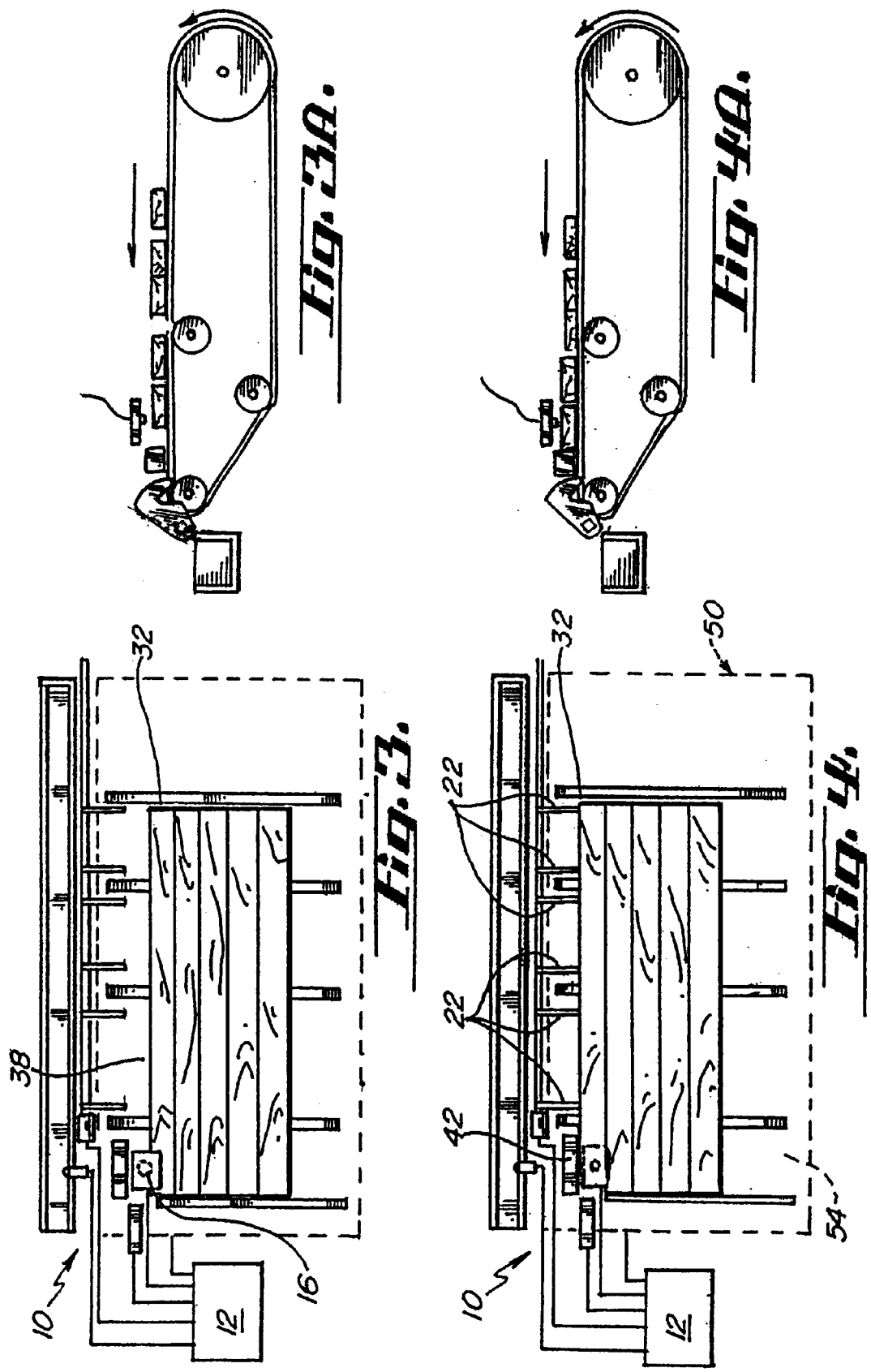

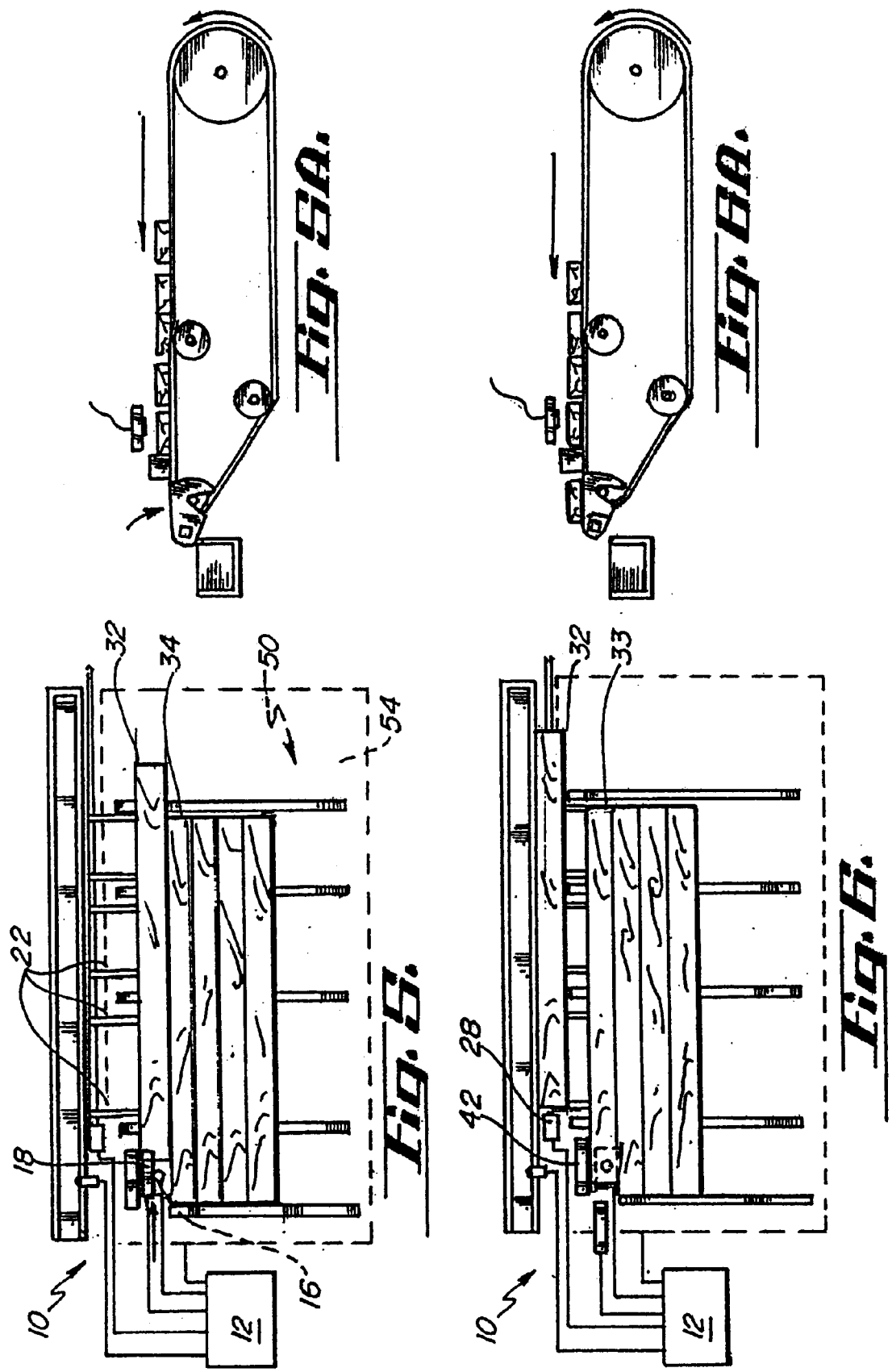

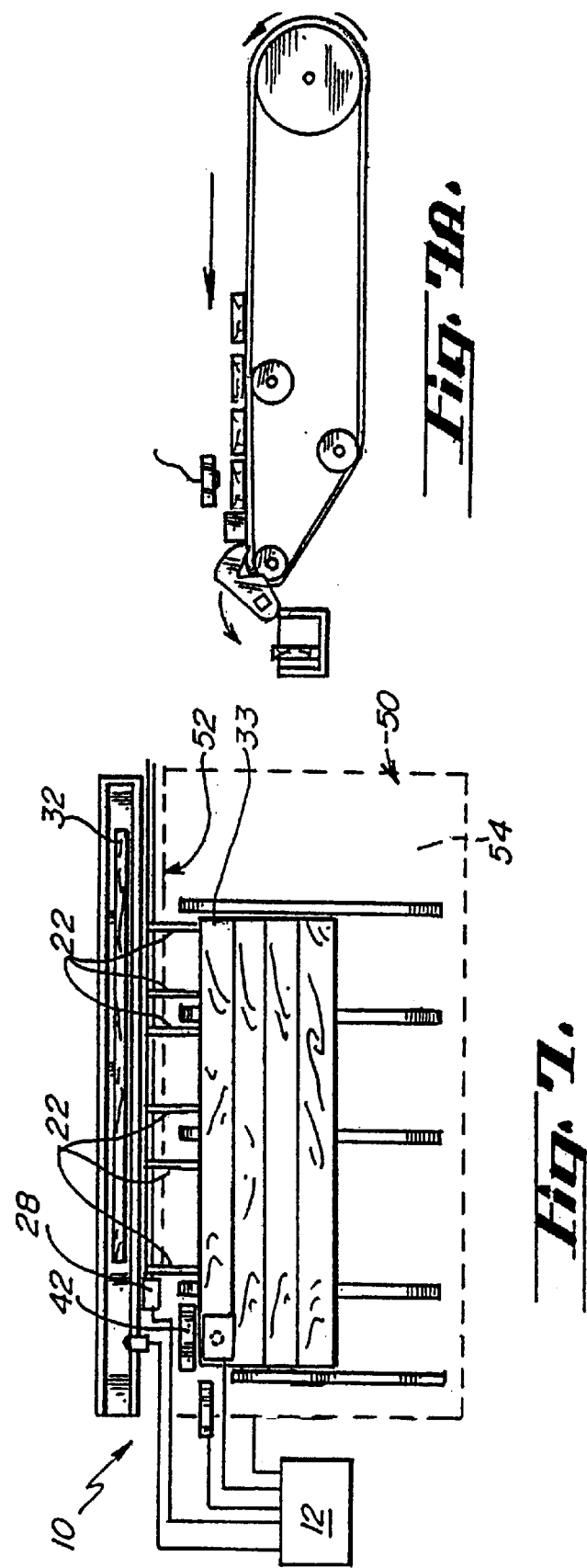

INTELLIGENT DECK APPARATUS AND METHOD FOR POSITIONING WORKPIECES IN PREPARATION FOR PROCESSING

RELATED APPLICATIONS

This application claims the benefit of U.S. Provisional Application Ser. No. 60/263,373 filed on Jan. 23, 2001, which is hereby incorporated herein by reference.

FIELD OF THE INVENTION

This invention relates to an apparatus and method for placing particular articles in a particular manner, and specifically to changing the attitude of an article relative to the direction that article is conveyed. In particular, this invention relates to moving workpieces from a conveyor system to a system for processing the workpieces by using at least one sensor to indicate when a workpiece may be moved from the conveyor system to the processing system.

BACKGROUND OF THE INVENTION

Apparatus and methods for conveying workpieces to a system for processing these workpieces have existed for many years. Two industries that utilize these kinds of apparatus and methods are the lumber industry and the steel industry. A typical conveyance arrangement utilizes chains or belts to move lumber or metal pieces along in a side-by-side manner so that they can be processed one at a time. A problem that arises with these apparatus is how to move one workpiece at a time from the conveyor system to a processing system. Another problem that arises is how to prevent a workpiece that is being moved from interfering with the proper handling of another workpiece, particularly the immediately previous or subsequent workpiece. For example, a workpiece cannot be moved too early or it may land on top of or interfere in another manner with a previous workpiece.

A conventional way to solve these problems spaces workpieces apart on a conveyor system so that their timely conveyance to a processing system prevents these problems. That is, each workpiece is sufficiently spaced apart from adjacent workpieces so that it does not interfere with moving or handling the adjacent workpieces. Jackson, U.S. Pat. No. 5,992,484, Method and Apparatus for Positioning Flitches or Cants for a Board Edger or Gang Saw, describes such a solution for moving boards on a conveyor system. A rotational framework is synchronized with the conveyor using a timing chain or belt, so that a platform can rotate under a board to lift the board from the conveyor and onto a bed of rollers. To use this solution, the conveyor system needs a mechanism such as sequencing duckers to keep the boards properly spaced. Moreover, the width of the boards that can be lifted and the spacing of the sequencing duckers on which the boards must be placed are directly affected by the size of the rotational framework.

An alternative solution incorporates sensing devices into conveyor systems to assist in handling workpieces. Ritola, U.S. Pat. No. 5,685,410, Infeed Conveyor System, for example, describes scanning devices used to determine desired cutting patterns for a saw and the length, width, and profile of a board. Walker, Jr., U.S. Pat. No. 5,208,962, Method and Apparatus for Affixing Tags on Lumber, describes sensors used to staple tags to boards, and Weislogel et al., U.S. Pat. No. 4,606,387, Machine and Method for Trimming a Stack of Veneers, describes sensors used to control trimming veneer sheets. In Raybon et al., U.S. Pat. No. 5,605,216, Board Turning Apparatus, photocells are used to both scan boards to determine board quality as well as to detect the leading edge of a board that needs to be flipped over. Kohlberg, U.S. Pat. No. 3,970,128, Orientation of Cant for Translatory Feed Through Edging Cutters, also uses sensors to find the leading edge of a board. Neither of these latter two inventions, however, resolves how to distinguish between abutting workpieces on a conveyor system. Consequently, spacing workpieces is still used to move workpieces along in a side-by-side manner so that they can be processed one at a time.

While existing conveyor system schemes have addressed many of the efficiency problems of moving workpieces from a conveyor system to a processing system, it would be advantageous to have a system capable of sensing or otherwise distinguishing the front edge of one workpiece from the back edge of the previous workpiece as they move side-by-side. In doing so, devices to space workpieces become unnecesary, more footage can be loaded onto a conveyor system at anytime, and workpieces of greater width can be moved.

SUMMARY OF THE INVENTION

Preferred embodiments of the present invention relate to an intelligent deck apparatus and method. The intelligent deck apparatus is used for serially moving workpieces positioned side-by-side on a conveyor system to a processing system. By deploying a workpiece edge detector system, the intelligent deck eliminates having to space workpieces when they are loaded onto a conveyor system or use any special mechanisms with the conveyor system to ensure that workpieces timely arrive at the other end of the conveyor system. Workpieces need only travel in their typical manner, transversely to their longitudinal dimension, so that each workpiece can be distinguished by a sensor. Thus, multiple workpieces can be loaded onto a conveyor system and more footage can be loaded onto a conveyor system at any one time. The intelligent deck also can accommodate workpieces having greater widths and workpieces of varying widths. Finally, as those skilled in the art are aware, a variety of means for loading workpieces onto a live deck of a conveyor system, whether manual or electromechanical such as magazine unloaders, can be used with the intelligent deck. The intelligent deck uses simple parts, so it is also easy to operate and maintain. Thus, human intervention is minimal, and workers can attend more to stocking workpieces and/or operating other machines.

The intelligent deck is used on the receiving end of a conveyor system. A manual or automatic loading system can be used to load workpieces onto the conveyor system so that they travel in a side-by-side manner transversely to their longitudinal dimension towards the receiving end of the conveyor system. A preferred embodiment of an intelligent deck is comprised of a computer system, an edge detector system, and a shift mechanism. The computer system is used for processing signals from the edge detector system and sending well timed signals to the conveyor system and the shift mechanism. The computer system is also operatively connected to the processing system. The edge detector system includes at least one sensor, although a plurality of sensors could be used. The edge detector system is operatively connected to the computer system and is positioned and arranged on the receiving end of the conveyor system for detecting the next edge of the leading workpiece that is in line with the at least one sensor. The phrase "in line with the at least one sensor" means that the respective workpiece is positioned such that it will trigger or actuate the at least one sensor if the workpiece continues moving in the direction that the conveyor system has been moving it. The phrase "leading workpiece" refers to the workpiece that is both closest to the receiving end of the conveyor system and satisfies any specified conditions; and the phrase "next edge" refers to the next edge that is to pass over, under, or through, whichever is appropriate, the at least one sensor. The edge detector system signals the computer system, which then activates the shift mechanism at the appropriate times. The shift mechanism is also operatively connected to the computer system and positioned and arranged on the receiving end of the conveyor system. The shift mechanism is used for shifting a workpiece so that the at least one sensor can subsequently detect the next edge of the leading workpiece that is in line with the at least one sensor. Preferably the shift mechanism will move the leading workpiece longitudinally.

A preferred embodiment may further consist of a lift arm system. The conveyor system is used to move a workpiece into a position so that the lift arm system can receive and move the workpiece from the conveyor system to a processing system. The lift arm system is operatively connected to the computer system to receive signals therefrom and has at least one lift arm and a means to actuate the lift arm. To ensure that a workpiece will be moved to a processing system only in a manner that does not interfere with previous workpieces, a preferred embodiment also can include a workpiece processing detection system. The workpiece processing detection system is operatively connected to the computer system to send signals thereto and is positioned and arranged so that it detects when previous workpieces have progressed sufficiently so that they will not be affected by moving another workpiece to a processing system. As those skilled in the art are aware, one or a combination of several kinds of sensors can be used as the means of detection, such as photo, optic, magnetic, or pressure sensitive sensing devices. The workpiece processing detection system also may be used to stop and start the conveyor system, control its speed, or coordinate the movements of workpieces in any similar manner.

BRIEF DESCRIPTION OF THE DRAWINGS

FIG. 3 is a top view illustrating the loading step of using an intelligent deck.

FIG. 3A is a side view illustrating the loading step of using an intelligent deck.

FIG. 4 is a top view illustrating the accumulation step of using an intelligent deck.

FIG. 4A is a side view illustrating the accumulation step of using an intelligent deck.

FIG. 5 is a top view illustrating the shift step of using an intelligent deck.

FIG. 5A is a side view illustrating the shift step of using an intelligent deck.

FIG. 6 is a top view illustrating the lift arm system receiving a workpiece.

FIG. 6A is a side view illustrating the lift arm system receiving a workpiece.

FIG. 7 is a top view illustrating the lift arm system moving a workpiece to a processing system.

FIG. 7A is a side view illustrating the lift arm system moving a workpiece to a processing system.

DESCRIPTION OF THE PREFERRED EMBODIMENT

Figure 1:
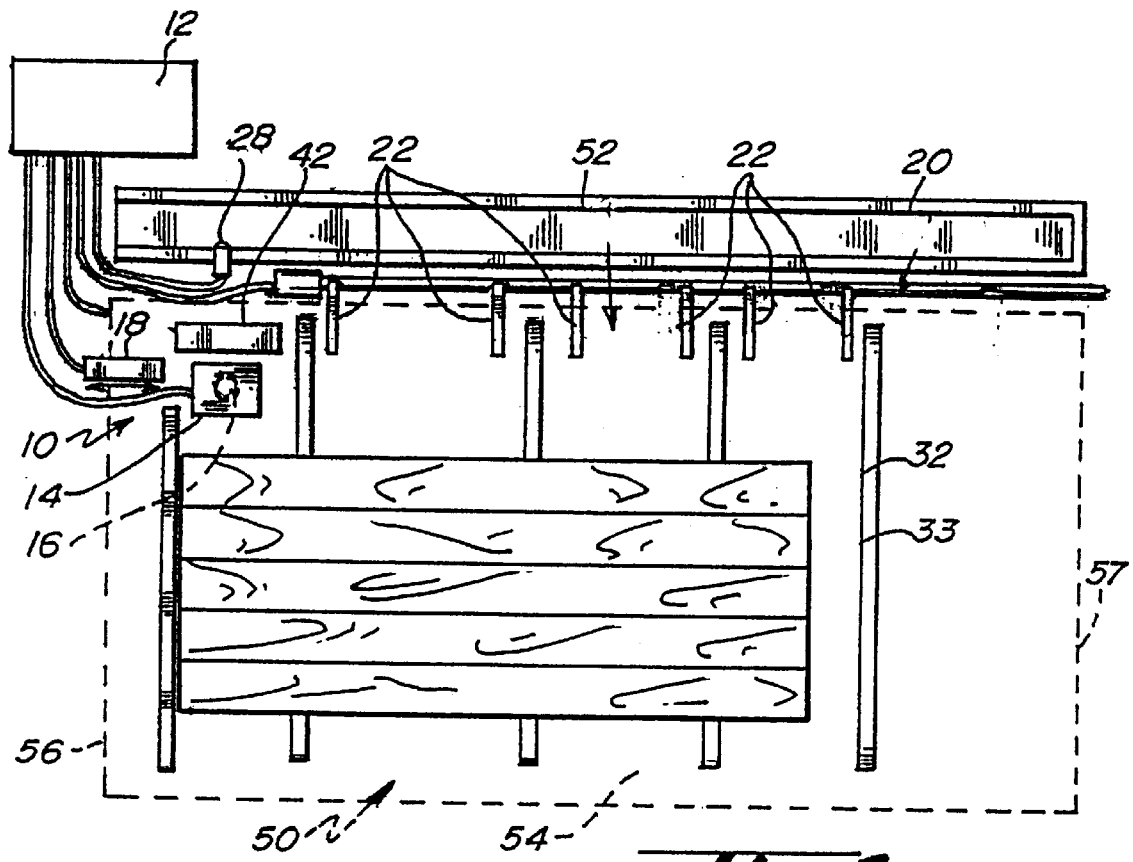
FIG. 1 is a top view of an intelligent deck.
Figure 2:
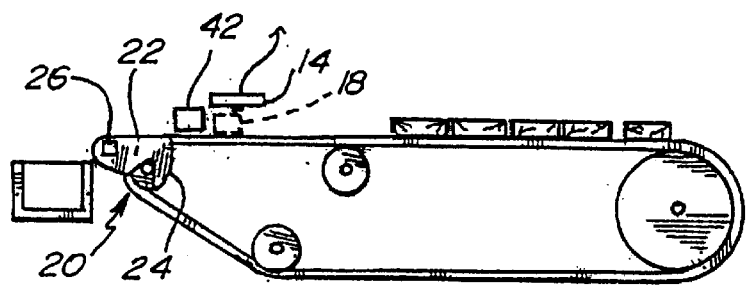
FIG. 2 is a side view of an intelligent deck.

FIG. 1 shows a top view and FIG. 2 shows a side view of the preferred embodiment of an intelligent deck apparatus 10 in accordance with the present invention. The intelligent deck 10 is used in combination with a conveyor system 50 having both a receiving end 52 and a live deck 54 having sides 56 and 57. The intelligent deck 10 is comprised of a computer system 12, edge detector system 14, a shift mechanism 18, a lift arm system 20, and a workpiece processing sensor system 28.

The computer system 12 is used to coordinate and manage the signals and operations of the intelligent deck. It 12 receives signals from the edge detector system 14 and the workpiece processing detection system 28, processes signals, and sends well timed signals to the shift mechanism 18 and the lift arm system 20. The computer system 12 is a micro-controller, although those skilled in the art are aware that the computer system 12 also can be a microprocessor, personal computer, or other computational machine that can be programmed and implemented to receive signals, process signals, and send well timed signals.

The edge detector system 14 includes at least one sensor 16 and is operatively connected to the computer system 12 to send signals thereto. In the preferred embodiment, the edge detector system 14 is located on side 56 of the live deck 54 on the receiving end 52 of the conveyor system and has one sensor 16. The preferred embodiment uses an electronic opto beam and sensor combination whereby the sensor detects an interruption in the opto beam when a workpiece passes between the sensor and source of the beam. Those skilled in the art are also aware that other kinds of sensors can be used as well, such as those enumerated for the workpiece processing detection system. The edge detector system 14 is repositionable such as by sliding the sensor 16 along or detaching and reattaching the sensor 16 to side 56 to accommodate workpieces of unusually wide or narrow widths.

The shift mechanism 18 is used to shift a workpiece longitudinally or forward, depending on the overall system design of the intelligent deck 10. By sufficiently shifting the leading workpiece 32, the edge detector system 14 can detect the next edge 36 of the leading workpiece that is in line 34 with the sensor 16. The shift mechanism 18 is operatively connected to the computer system 12 to receive signals therefrom and is located between the sensor 16 and the receiving end 52 of the conveyor system 50, on the same side 56 as is the sensor 16. The preferred embodiment uses a pneumatically driven arm for the shift mechanism 18, although those skilled in the art are aware that a hydraulic device, a spring driven device, rollers, a gripping mechanism, or any similar means for shifting a workpiece may be used.

The preferred embodiment of the intelligent deck 10 shifts workpieces longitudinally. As a leading workpiece 32 travels towards the receiving end 52 of the conveyor system 50, the front edge 38 of the leading workpiece 32 activates the sensor 16. The shift mechanism 18 is then actuated at the appropriate time to sufficiently shift this workpiece 32 longitudinally away from and out of the range of the sensor 16, so that the sensor 16 can subsequently detect the front edge 38 of a subsequent workpiece 33 as it too travels towards the receiving end 52 of the conveyor system 50. In an alternative embodiment, the shift mechanism 18 is actuated to shift the leading workpiece 32 forward to create a space between this workpiece 32 and the subsequent workpiece 33. The sensor 16 then can be used to detect the back edge 40 of the leading workpiece 32. Detecting either the front edge 38 of the subsequent workpiece 33 and/or the back edge 40 of the leading workpiece 32 generates a signal that is used by the computer system 12 to determine the appropriate time for actuating the lift arm system 20 to receive and move a workpiece from the conveyor system 50 to a processing system 60.

The lift arm system 20 is operatively connected to the computer system 12 to receive signals therefrom and has at least one pivotable lift arm 22 and a means to actuate (not shown) the at least one lift arm 22. When multiple lift arms 22 are used, it is preferable that they 22 are axially aligned and synchronous. The preferred embodiment has six pivotable lift arms 22 that are strapped to a rotational, four-sided hollow rod 26 using U-bolts, which rod 26 is connected to the receiving end 52 of the conveyor system 50. Those skilled in the art are aware that there are numerous other means to attach the lift arms 22 to a rod 26 for dependent, synchronous motion. Alternatively, each of the lift arms 22 could be mounted on its 22 own axle for independent, synchronous motion. The conveyor system 50 is used to move a workpiece into proper position so that the lift arm system 20 can receive and move the workpiece from the conveyor system 50 to a processing system 60. The conveyor system 50 may be higher than a processing system 60, depending on the pivot point of the lift arms 22, so that upon actuation of the lift arm system, a workpiece can be gravitationally moved to a processing system. As those skilled in the art are aware, the solid lift arm 22 may be replaced by similar means for gravitationally moving a workpiece, such as a tiltable bed of rollers.

In the preferred embodiment, the lift arms 22 are generally wedged shaped and axially aligned at the tip end of the wedge, where they 22 are connected to the rod 26. The wider end or front guard portion or stop portion 24 is used for preventing workpieces from moving under the lift arms 22 when they are in a raised position and for accumulating and aligning workpieces at the receiving end 52 of the conveyor system 50. The lift arms 22 are positioned so that the tip end is behind the receiving end 52 of the conveyor system 50 and the front guard portion 24 is facing the conveyor system 50. The lift arms 22 are partially positioned between the looped belts or chains of the live deck 54 of the conveyor system 50 so that workpieces can be positioned easily for being received by the lift arm system 20. Each looped belt has a looped end at the receiving end.

The intelligent deck apparatus 10 is implemented for use on the receiving end 52 of a conveyor system 50 for moving workpieces from the conveyor system 50 to a processing system 60 at the appropriate time. Workpieces are first loaded electro-mechanically or manually onto the conveyor system 50 so that the workpieces travel in a side-by-side manner transversely to their longitudinal dimension towards the intelligent deck apparatus 10. Preferably, one end of each of the workpieces travels proximate the side 56 of the live deck 54 to which the sensor 16 is attached. The sensor 16 is located along the side 56 so that each workpiece that passes by the sensor 16 must activate the sensor 16. Preferably, unless a workpiece is being shifted or moved onto the lift arms 22, the lift arms 22 are in a raised position for the intermittent period of time to prevent a workpiece from traveling over the lift arms 22 and to help accumulate and properly align the workpieces.

FIGS. 3 through 7A depict the steps for one operating cycle of the intelligent deck apparatus 10. As shown in FIGS. 3 and 3A, the sensor 16 is first activated by the front edge 38 of the leading workpiece 32 and signals this event to the computer system 12. As shown in FIGS. 4 and 4A, the live deck 54 of the conveyor system 50 continues to move the leading workpiece 32 into an abutting position against a stop block 42 and the lift arms 22 and to accumulate and align the following workpieces, and then stops. The computer system signals the live deck 54 to stop after about four to five seconds. The stop block 42 is used to position the leading workpiece 32 to begin the process of positioning it 32 over the lift arms 22. In the preferred embodiment, the stop block 42 is less than twelve inches in length. A stop block is used only when the leading workpiece 32 is shifted longitudinally. The computer system then signals the lift arms 22 to lower from their 22 raised or obstructing position into a position to receive the leading workpiece 32. Lowering the lift arms 22 reduces the friction between the workpieces when the leading workpiece 32 is shifted. Alternatively, the lift arms 22 could be left in the raised position until after the leading workpiece 32 is shifted or the live deck 54 could be momentarily reversed.

As shown in FIGS. 5 and 5A, the shift mechanism 18 is positioned and arranged so that, at this time, the leading workpiece 32 is located adjacent to the shift mechanism 18. The computer system 12 signals the shift mechanism to longitudinally shift the leading workpiece 32 so that the stop block 42 can no longer interfere with the transverse movement of the leading workpiece 32. The computer system 12 then signals the live deck 54 of the conveyor system 50 to restart. Shifting the leading workpiece 32 also reestablishes the sensor 16.

As shown in FIGS. 6 and 6A, the live deck 54 is restarted so that the workpieces thereon can begin moving forward again. The shifted, leading workpiece 32 is consequently moved over the lift arms 22 and into position for moving from the conveyor system 50 to a processing system 60 by the time the subsequent workpiece 33 activates the sensor 16 and the live deck 54 again stops. At this time, the leading workpiece 32 is positioned almost entirely over the lift arms 22 while none of the subsequent workpiece 33 is so positioned.

As shown in FIGS. 7 and 7A, the computer system 12 signals the lift arms 22 to raise to move the leading workpiece 32 from the conveyor system 50 to a processing system 60. The lift arms remain in the raised position while the live deck 54 is again restarted for a period sufficient to accumulate and align all the remaining workpieces on the conveyor system 50 at the receiving end 52 and to move the subsequent workpiece 33 into an abutting position against stop block 42. Workpiece 33 becomes the next workpiece that will be moved to the processing system 60. The above described process is then repeated. Sensor 28 can stop and start the above described process at any time to coordinate the movements of workpieces in a processing system 60 and movements of workpieces on the conveyor system 50.

Although the preferred embodiment of the intelligent deck apparatus has been described herein, it should be recognized that numerous changes and variations can be made and that the scope of the present invention is to be defined by the claims.

That which is claimed:

1. An intelligent deck apparatus in combination with a conveyor system having a receiving end, for serially moving a plurality of workpieces, each workpiece having a longitudinal dimension and a pair of sides, the workpieces positioned side-by-side on the conveyor system for moving in a direction transversely to the longitudinal dimensions of said workpieces to a processing system adjacent to the receiving end, the apparatus comprising:

an edge detector system having at least one sensor and being positioned and arranged on the receiving end of the conveyor system for detecting the next edge of a leading workpiece in line with the at least one sensor;

a shift mechanism positioned and arranged on the receiving end of the conveyor system for shifting the leading workpiece in a longitudinal direction with respect to said workpiece so that the edge detector system may detect a next edge of a next leading workpiece in line with the at least one sensor;

a lift arm system for receiving and moving each workpiece from the conveyor system to the processing system, wherein the lift arm system is connected to the receiving end of the conveyor system and has at least one lift arm; and a computer system operatively connected to the conveyor system, the edge detector system, the shift mechanism, and the lift arm system.

2. The intelligent deck apparatus of claim 1, wherein the conveyor system has a plurality of looped belts each with a loop end at the receiving end.

3. The intelligent deck apparatus of claim 1, wherein said at least one lift arm system is a plurality of lift arms that are axially aligned and synchronous.

4. The intelligent deck apparatus of claim 1, wherein the at least one lift arm has a front guard portion, and wherein the at least one lift arm is in a raised position during intermittent periods for accumulating and aligning workpieces at the receiving end of the conveyor system.

5. The intelligent deck apparatus of claim 1, wherein the at least one sensor is an electronic opto beam and sensor combination.

6. The intelligent deck apparatus of claim 1, wherein the conveyor system has a live deck having two sides, the at least one sensor is proximate one side of the live deck, and one end of each workpiece moves along the side of the live deck to which the at least one sensor is proximate.

7. The intelligent deck apparatus of claim 1, further comprising a stop block for aligning a leading workpiece with the shift mechanism and for assisting to accumulate and properly align a subsequent workpiece at the receiving end of the conveyor system.

8. The intelligent deck apparatus of claim 1, wherein the edge detector system is repositionable towards or away from the receiving end of the conveyor system.

9. The intelligent deck apparatus of claim 1, further comprising a workpiece processing detection system operatively connected to the computer system for coordinating movements of workpieces on the conveyor system with movements of workpieces in the processing system.

10. An intelligent deck apparatus in combination with a conveyor system having a receiving end, for serially moving workpieces positioned side-by-side on the conveyor system to a processing system, the apparatus comprising:

an edge detector system having at least one sensor and being positioned and arranged on the receiving end of the conveyor system for detecting a next edge of a leading workpiece that is in line with the at least one sensor;

a shift mechanism positioned and arranged on the receiving end of the conveyor system for shifting a leading workpiece so that the edge detector system detects a next edge of the leading workpiece that is in line with the at least one sensor;

a lift arm system connected to the receiving end of the conveyor system and having at least one lift arm, for receiving and moving each workpiece from the conveyor system to the processing system; and a computer system operatively connected to the conveyor system, edge detector system, shift mechanism, and lift arm system.

11. An intelligent deck apparatus in combination with a conveyor system having a receiving end, for serially moving workpieces positioned side-by-side on the conveyor system to a processing system, the apparatus comprising:

an edge detector system having at least one sensor and being positioned and arranged on the receiving end of the conveyor system for detecting a front edge of a leading workpiece that is in line with the at least one sensor;

a shift mechanism positioned and arranged on the receiving end of the conveyor system for longitudinally shifting a leading workpiece so that the edge detector system detects a front edge of a subsequent workpiece;

a lift arm system connected to the receiving end of the conveyor system and having at least one lift arm, for receiving and moving each workpiece from the conveyor system to the processing system, wherein the at least one lift arm has a front guard portion, and wherein the at least one lift arm is in a raised position during intermittent periods for accumulating and aligning workpieces at the receiving end of the conveyor system;

a workpiece processing detection system positioned and arranged on the processing system for coordinating movements of workpieces on the conveyor system with movements of workpieces in the processing system; and a computer system operatively connected to the conveyor system, edge detector system, shift mechanism, lift arm system, and workpiece processing detection system.

12. An intelligent deck apparatus in combination with a conveyor system having a receiving end, for serially moving workpieces positioned side-by-side on the conveyor system to a processing system, the apparatus comprising:

a means positioned and arranged on the receiving end of the conveyor system for detecting the next edge of a leading workpiece that is in line with the means for detecting edges;

a means positioned and arranged on the receiving end of the conveyor system for shifting a leading workpiece so that the means for detecting edges detects the next edge of the leading workpiece that is in line with the means for detecting edges;

a means for processing signals operatively connected to the conveyor system, means for detecting edges, and the means for shifting workpieces.

13. The intelligent deck apparatus of claim 12, further comprising a means for receiving and moving each workpiece from the conveyor system to the processing system, wherein the means for receiving and moving each workpiece is connected to the receiving end of the conveyor system and operatively connected to the means for processing signals.

14. A method for moving workpieces from the receiving end of a conveyor system to a processing system, said method comprising the steps of:

(a) providing an intelligent deck apparatus in combination with a conveyor system having a receiving end, the intelligent deck comprising an edge detector system having at least one sensor, a shift mechanism, a lift arm system having at least one lift arm, and a computer system;

(b) positioning workpieces on the conveyor system for moving side-by-side towards the receiving end of the conveyor system;

(c) positioning the sensor for detecting the front edge of a leading workpiece or the front edge of a subsequent workpiece on the conveyor system;

(d) sensing the front edge of the leading workpiece;

(e) accumulating workpieces at the receiving end of the conveyor system so that the workpieces are adjacent to one another and properly aligned on the conveyor system;

(f) lowering the at least one lift arm;

(g) shifting the leading workpiece longitudinally away from and out of the range of the sensor;

(h) moving the leading workpiece onto the at least one lift arm;

(i) sensing the front edge of the subsequent workpiece;

(j) raising the at least one lift arm;

(k) repeating steps (e) through (j) until there is only one workpiece on the conveyor system.

15. The method of claim 14, wherein the step of shifting the leading workpiece shifts the workpiece longitudinally away from and out of the range of the at least one sensor.

16. The method of claim 14, wherein steps (c) through (f) are controlled by a programmable machine.

17. A method for processing a plurality of workpieces side-by-side and with one end of each workpiece in substantial alignment with an end of the other workpieces on a conveyor processing system, the method comprising the steps of:

(a) moving the conveyor so that workpieces including a leading workpiece advance serially toward a receiving end of the conveyor;

(b) triggering an edge detector sensor positioned at the receiving end of the conveyor by a leading edge of the leading work piece as the plurality of workpieces are advancing;

(c) providing a stop in front of the advancing plurality of workpieces such that the plurality of workpieces accumulate side-by-side against said stop;

(d) stopping the advancement of the plurality of workpieces;

(e) longitudinally shifting the lead workpiece a distance less than the length of said work piece after the advancement has been stopped;

(f) transferring said lead workpiece in a direction transverse to its length into the processing station after the lead workpiece has been longitudinally shifted;

(g) restarting the conveyor to further advance the plurality of workpieces on the conveyor.

* * * * *